(12) United States Patent
Frait et al.

(10) Patent No.: US 12,072,020 B2
(45) Date of Patent: Aug. 27, 2024

(54) UNITIZED VALVE BODY HAVING ANNULUS

(71) Applicant: Ford Global Technologies, LLC, Dearborn, MI (US)

(72) Inventors: Steven Anatole Frait, Milan, MI (US); Ram Sudarsan Devendran, South Lyon, MI (US); Frank Hanson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 17/552,039

(22) Filed: Dec. 15, 2021

(65) Prior Publication Data
US 2023/0184364 A1 Jun. 15, 2023

(51) Int. Cl.
F16H 61/00 (2006.01)
F15B 13/08 (2006.01)
F16H 61/02 (2006.01)
F16L 41/16 (2006.01)

(52) U.S. Cl.
CPC ..... F16H 61/0009 (2013.01); F15B 13/0814 (2013.01); F15B 13/085 (2013.01); F16H 61/0206 (2013.01); F16H 61/0251 (2013.01); F16L 41/16 (2013.01)

(58) Field of Classification Search
CPC . F16H 61/0009; F15B 13/0814; F16K 27/003
See application file for complete search history.

(56) References Cited

U.S. PATENT DOCUMENTS

| | | | |
|---|---|---|---|
| 9,771,890 B2 | 9/2017 | Hwang | |
| 10,174,771 B2* | 1/2019 | Miyazoe | F16K 27/00 |
| 10,302,191 B2 | 5/2019 | Uesugi et al. | |
| 10,590,962 B2 | 3/2020 | Coolidge et al. | |
| 10,823,299 B2* | 11/2020 | Miyazoe | F16K 27/003 |
| 11,644,116 B1* | 5/2023 | Frait | F16K 27/003 |
| | | | 137/594 |
| 2012/0104293 A1 | 5/2012 | Fleischer et al. | |
| 2019/0178406 A1 | 6/2019 | Ishihara et al. | |
| 2019/0390664 A1 | 12/2019 | Babbini et al. | |
| 2020/0130101 A1 | 4/2020 | Jones et al. | |

FOREIGN PATENT DOCUMENTS

| | | |
|---|---|---|
| CN | 111779724 | 10/2020 |
| DE | 102019214685 | 3/2021 |
| EP | 3637110 | 4/2020 |

* cited by examiner

Primary Examiner — Michael R Reid
(74) Attorney, Agent, or Firm — Burris Law, PLLC

(57) ABSTRACT

A unitized valve body for use in an automatic transmission includes a valve bore and an annulus. The valve bore is configured to receive a valve. The annulus is in fluid communication with the valve bore. The annulus defines an outer portion having an outer diameter and an innermost portion located at an interface between the valve bore and the valve. The outer portion having a first axial length and the innermost portion having a second axial length. The first axial length is greater than the second axial length.

20 Claims, 8 Drawing Sheets

UNITIZED VALVE BODY HAVING ANNULUS

FIELD

The present disclosure relates to a valve body having an annulus and a vehicle including a valve body having an annulus.

BACKGROUND

The statements in this section merely provide background information related to the present disclosure and may not constitute prior art.

Transmission valve bodies typically consist of aluminum castings with worm trail routing of multiple connections between various working elements. These worm trail fluid paths typically must be two-dimensional, and cannot cross over the path of another trail. Due to this two dimensional limitation of typical transmission valve bodies, providing a flow path from one element to another can often require a lengthy and convoluted path that adds to the complexity, cost, and size of the casting.

One method of overcoming this two dimensional limitation includes manufacturing multiple valve bodies, each having its own two dimensional worm trails, and connecting the valve bodies with one or more separator plates configured to permit fluid communication between the worm trails of the valve bodies in a third dimension at predetermined locations. Such separator plates require gasket seals and precise machining of the gasket surfaces. These separator plates also only allow binary cross-over of the hydraulic circuitry from one two dimensional worm trail casting to another two dimensional worm trail casting. Furthermore, the use of separator plates typically requires the use of additional fasteners to connect the assembly together, which can increase cost and assembly time. Additionally, the two dimensional worm trails of each valve body must be routed around these fasteners, adding further size and complexity.

These sizing and complexity issues related to transmission valve bodies, among other issues related transmission valve bodies, are addressed by the present disclosure.

SUMMARY

This section provides a general summary of the disclosure and is not a comprehensive disclosure of its full scope or all of its features.

In one form, the present disclosure discloses a unitized valve body for use in an automatic transmission. The unitized valve body comprises a valve bore and a first annulus. The valve bore is configured to receive a valve. The first annulus is in fluid communication with the valve bore. The first annulus defines an outer portion having an outer diameter and an innermost portion located at an interface between the valve bore and the valve. The outer portion has a first axial length and the innermost portion has a second axial length. The first axial length is greater than the second axial length.

In variations of the unitized valve body of the above paragraph, which may be implemented individually or in any combination: the first axial length is at least two times greater than the second axial length; a second annulus is in fluid communication with the valve bore and axially spaced apart from the first annulus and a hydraulic passage fluidly couples the first annulus and the second annulus; the second annulus defines an outer portion having an outer diameter and an innermost portion located at an interface between the valve bore and the valve, the outer portion of the second annulus has a third axial length and the innermost portion of the second annulus has a fourth axial length, the third axial length is greater than the fourth axial length; a hydraulic passage fluidly couples the first annulus to a pressurized fluid source located external to the valve body; a flow area of the first annulus allows for fluid to flow between the hydraulic passage and the valve bore with a predetermined pressure drop; the valve body does not include mechanical fasteners; the valve body is formed by additive manufacturing; and the valve body does not include a separator plate.

In another form, the present disclosure discloses a unitized valve body for use in an automatic transmission. The unitized valve body comprises a valve bore and a plurality of annuluses. The valve bore is configured to receive a valve. The plurality of annuluses are axially spaced apart from each other and are in fluid communication with the valve bore. Each annulus defines an outer portion having an outer diameter and an innermost portion located at an interface between the valve bore and the valve. The outer portion has a first axial length and the innermost portion has a second axial length. The first axial length is greater than the second axial length.

In variations of the unitized valve body of the above paragraph, which may be implemented individually or in any combination: a hydraulic passage fluidly couples a first annulus of the plurality of annuluses and a second annulus of the plurality of annuluses and a hydraulic passage fluidly couples a first annulus of the plurality of annuluses to a pressurized fluid source located external to the valve body.

In yet another form, the present disclosure discloses a unitized valve body manufactured by an additive manufacturing process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
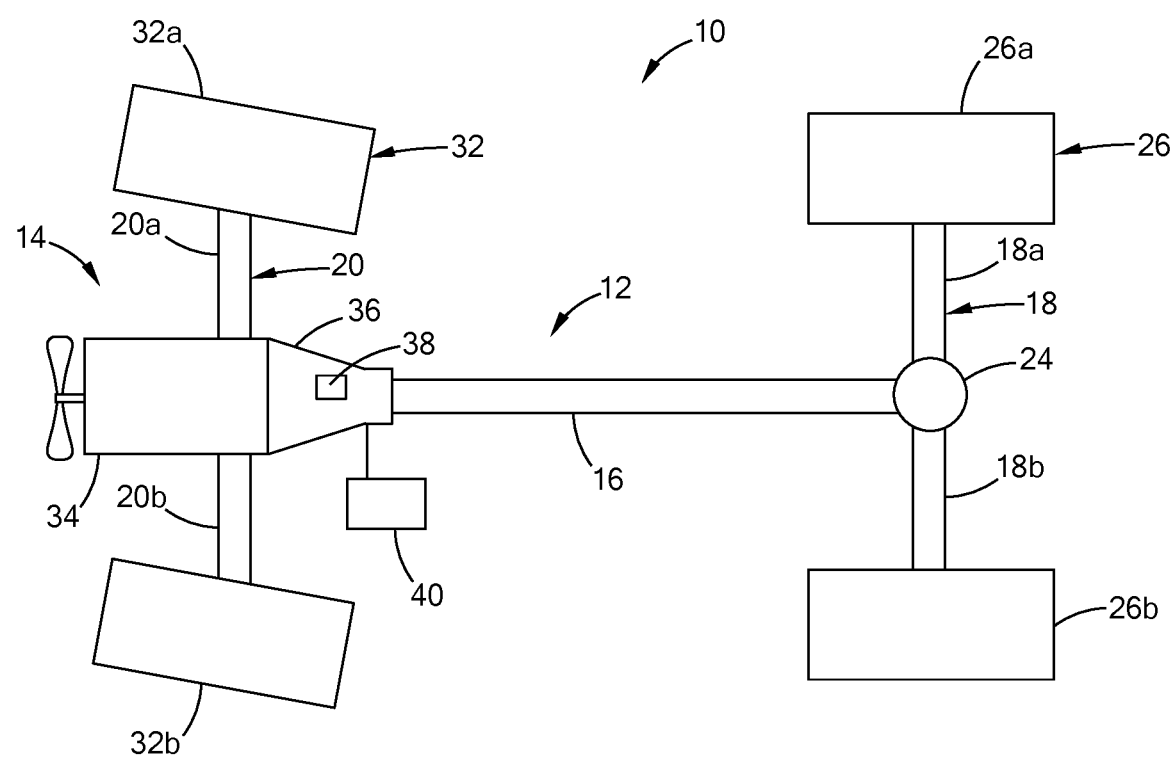
FIG. 1 is a schematic view of a vehicle including a transmission having a valve body assembly according to the principles of the present disclosure.
Figure 2:
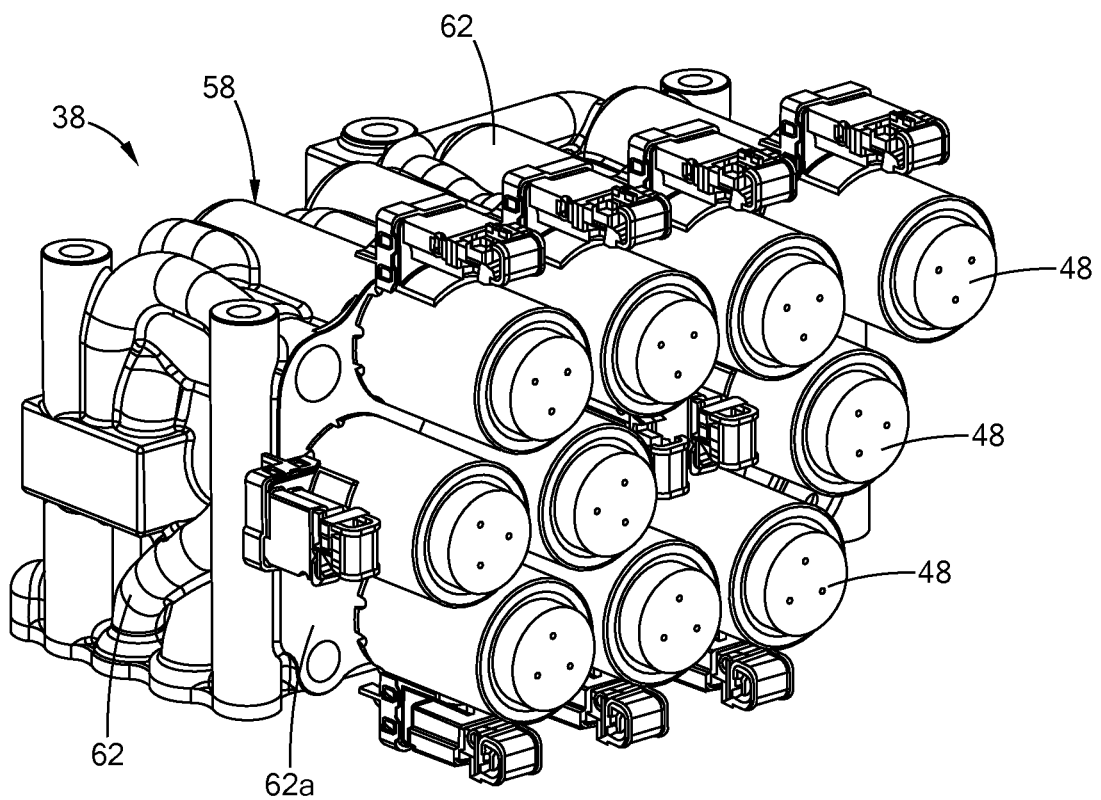
FIG. 2 is a perspective view of the valve body assembly of FIG. 1.
Figure 3:
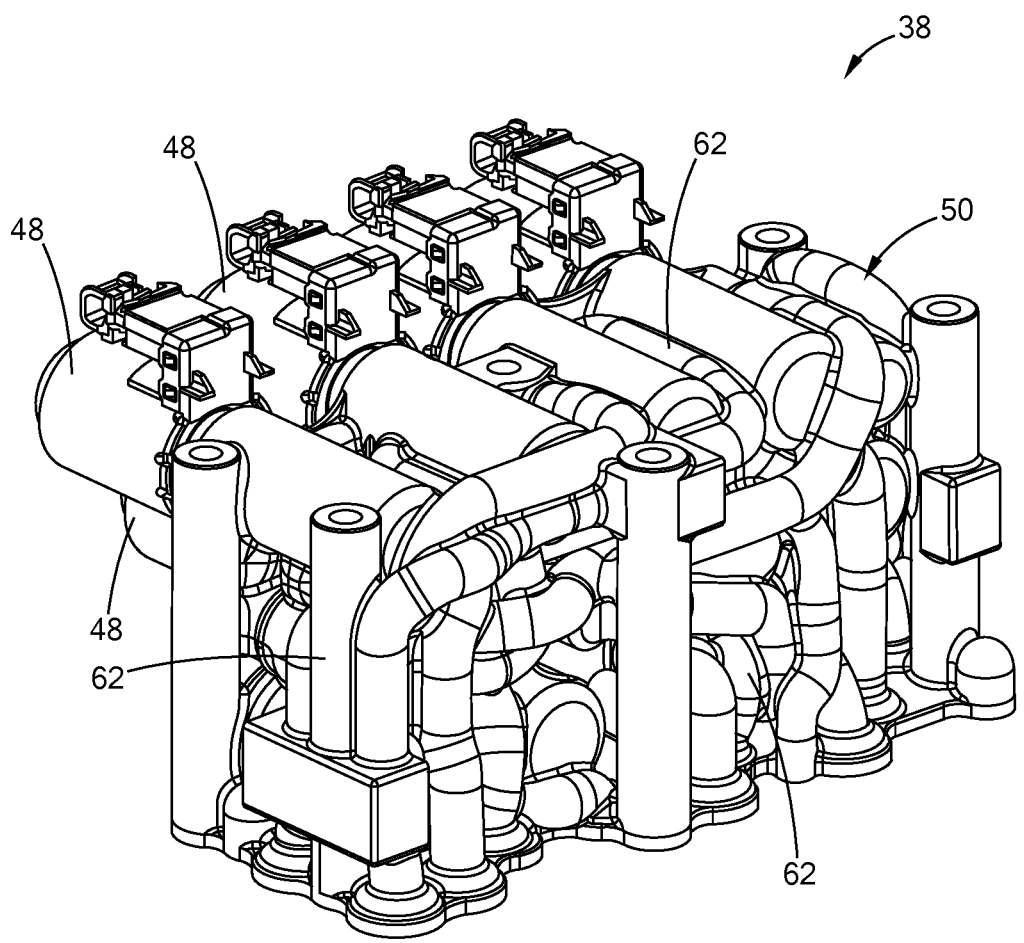
FIG. 3 is another perspective view of the valve body assembly of FIG. 1.
Figure 4:
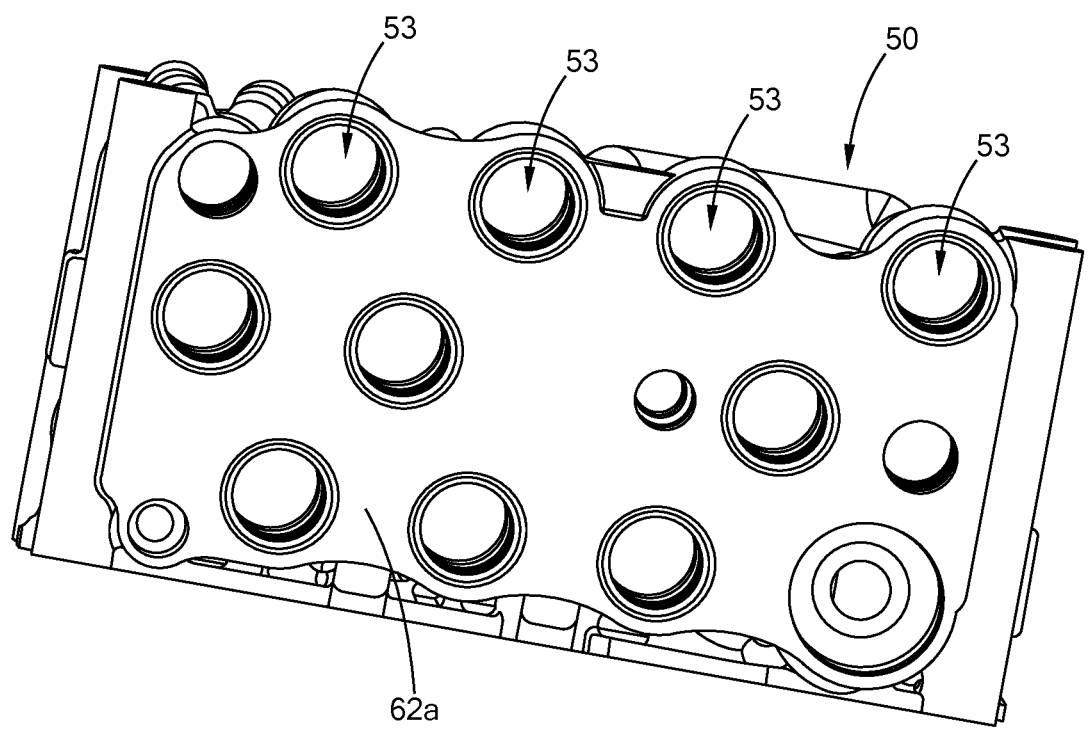
FIG. 4 is a side view of a valve body of the valve body assembly of FIG. 1.

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotary power generated by the powertrain system 14 is transmitted to the primary axle 18 via the propeller shaft 16 to drive a set of rear wheels 26. The primary axle 18 includes a first shaft 18a and a second shaft 18b. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36 such as an automatic transmission, for example. The engine 34 generates rotary power and may be an internal combustion engine, for example.

The transmission 36 transmits rotary power from the engine 34 to the drivetrain system 12. The transmission 36 is generally controlled using hydraulic fluid. That is, the transmission 36 is cooled, lubricated, actuated, and modulates torque, for example, using hydraulic fluid. To these ends, the transmission 36 is in electrical communication with an electronic controller 40 used to direct, control, or otherwise regulate flow of fluid throughout the transmission 36. In order to facilitate the flow of hydraulic fluid throughout the transmission 36, the vehicle 10 includes at least one or more pumps to supply pressurized fluid to the transmission 36. It should be appreciated that the pumps provide high flow high pressure hydraulic fluid to the transmission 36.

Figure 5:
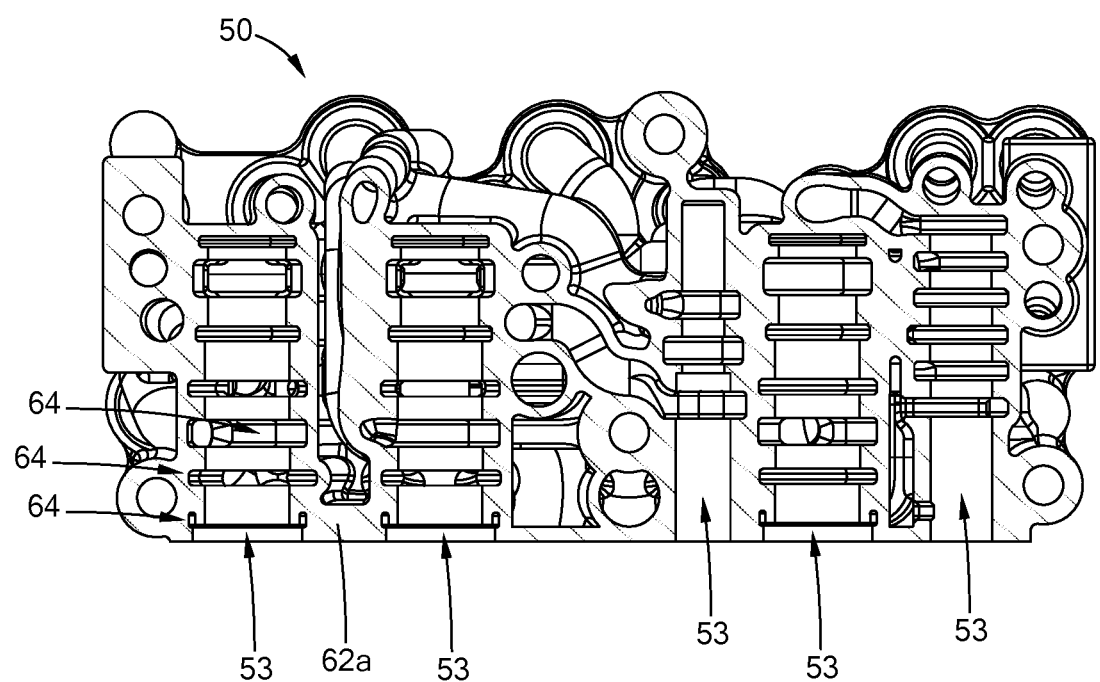
FIG. 5 is a cross-sectional view of the valve body of the valve body assembly of FIG. 1.
Figure 6:
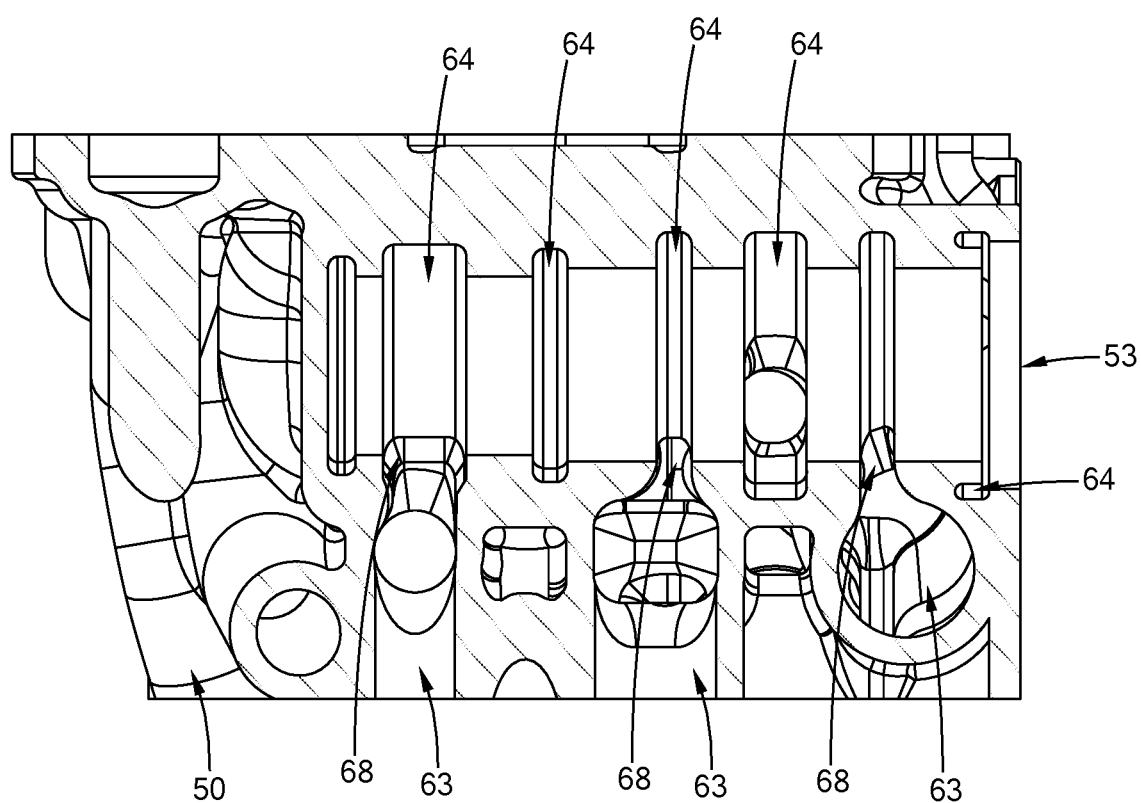
FIG. 6 is a cross-sectional view of a portion of the valve body of the valve body assembly of FIG. 1.
Figure 7:
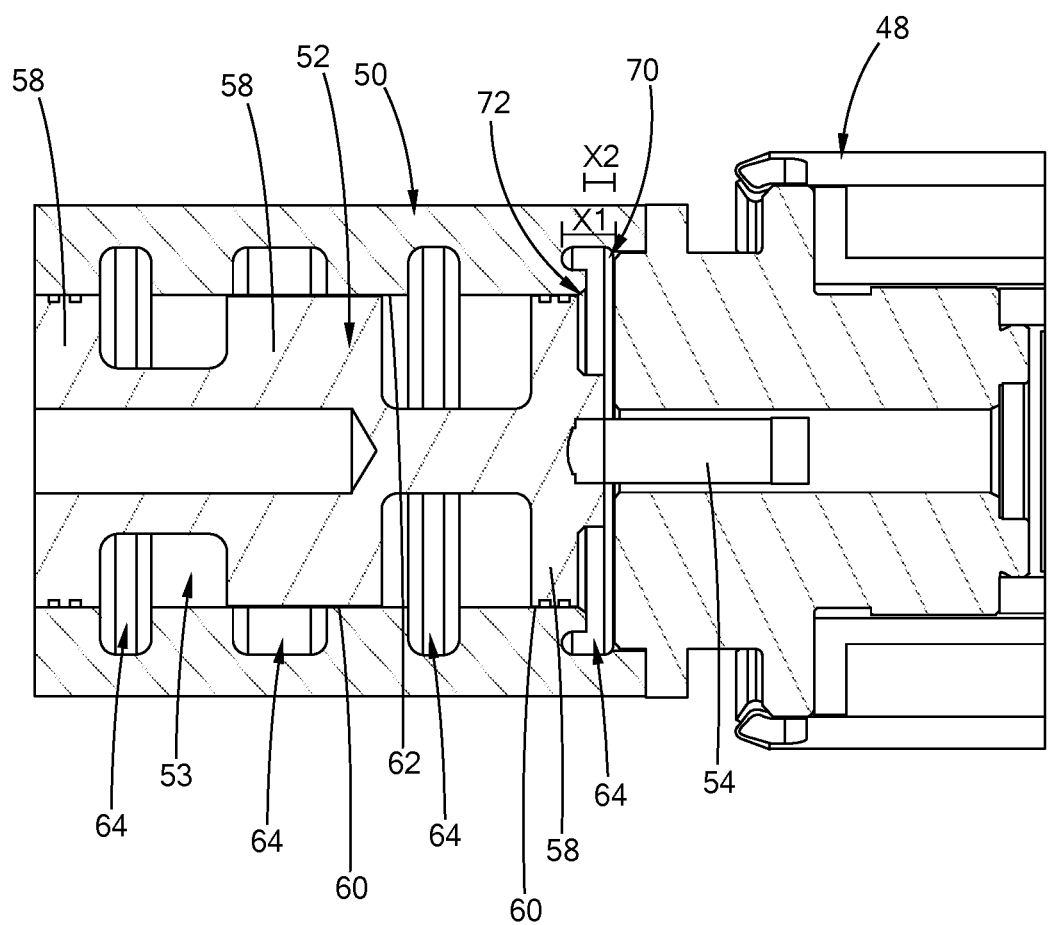
FIG. 7 is another cross-sectional view of a portion of the valve body of the valve body assembly of FIG. 1 with a spool valve slidably disposed within a valve bore of the valve body.

The transmission 36 includes, inter alia, a casing (not shown) and a valve body assembly 38. With reference to FIGS. 2-7, the valve body assembly 38 is secured to the casing and includes a plurality of solenoid actuators 48 and a valve body 50. As shown in FIG. 7, each solenoid actuator 48 includes a spool valve 52 (i.e., hydraulic control valve). The spool valve 52 is slidably disposed within a corresponding valve bore 53 of the valve body 50 and is configured to be axially positioned by an armature 54 of the solenoid actuator 48 depending on an activation state of the solenoid actuator 48. The spool valve 52 includes a plurality of cylindrical sealing segments 58 axially spaced apart from each other and having an outer diameter greater than adjacent lengths of the spool valve 52. A cylindrical surface 60 of the sealing segments 58 is allowed to engage an inner cylindrical surface 62 of the valve bore 53, while fluid communication is permitted in the areas between adjacent ones of the sealing segments 58. A spring (not shown) may bias the spool valve 52 in an axial direction within the valve bore 53. The solenoid actuators 48 can be on/off actuators, variable pressure actuators, or variable flow actuators and can receive electrical power from an electrical source and can receive control signals from a control module.

The valve body 50 is in the form of a single unitized, monolithic body that can be manufactured by an additive manufacturing process. In this way, the valve body 50 does not include fasteners such as bolts, for example, securing two or more shells or housings to each other and/or to one or more separator plates. The manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

The valve body 50 includes a plurality of sides 62. In the example illustrated, side 62a of the valve body 50 defines the plurality of valve bores 53 formed therein. The valve body 50 also defines a plurality of passages 63 (FIG. 6) and a plurality of annuluses or rings 64 (FIGS. 5-7). The plurality of passages 63 are in fluid communication with different devices through the transmission 36. For example, the passages 63 can be coupled to a corresponding one of a return line of a pump (not shown), an outlet of a cooling fluid circuit (not shown), a supply line of the pump (not shown), a clutch lubrication circuit (not shown), or a filtered fluid inlet (not shown), though other devices can be used.

Figure 8:
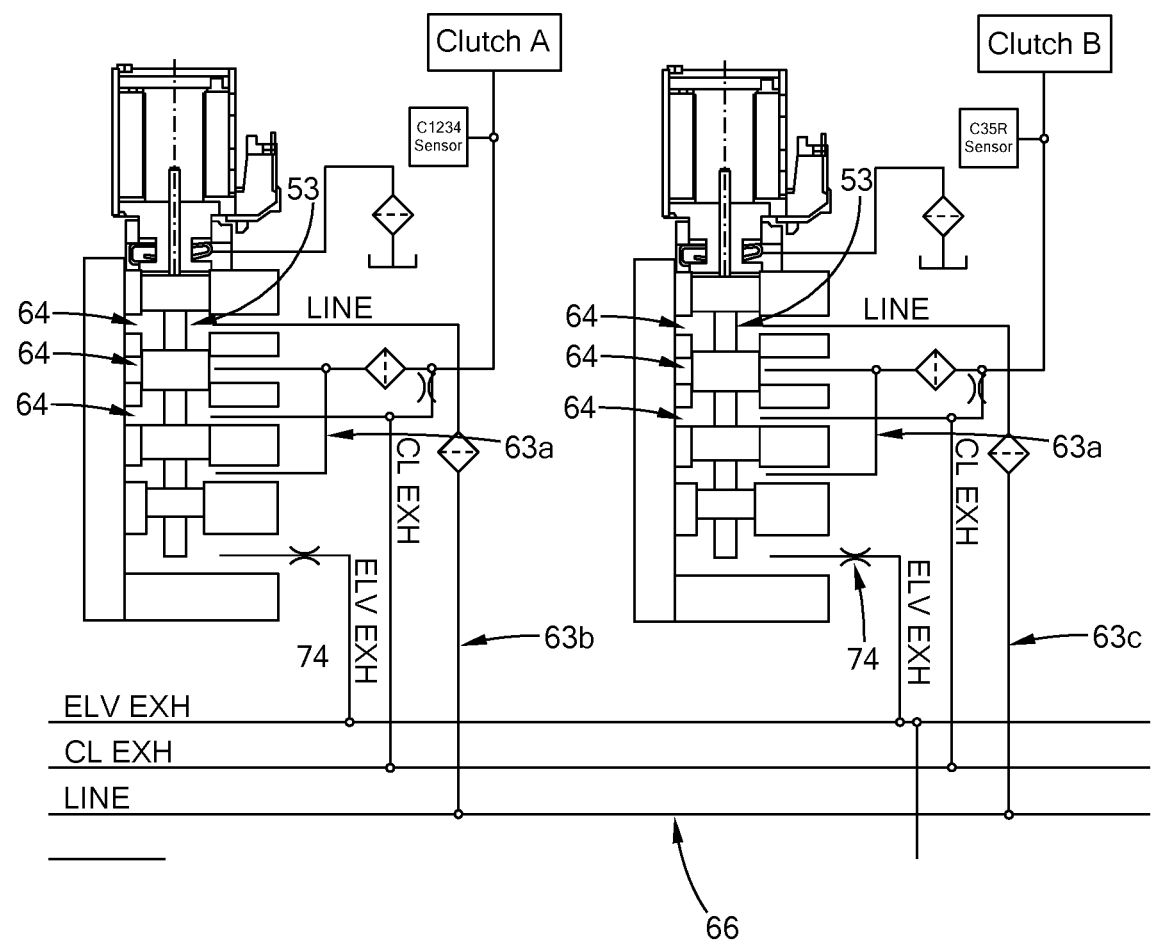
FIG. 8 is a schematic view of a portion of a hydraulic circuit of the transmission of FIG. 1.

As shown in FIG. 8, in one example, passage 63a fluidly connects one annulus 64 associated with a respective valve bore 53 to another annulus 64 associated with the respective valve bore 53. In another example, first and second connecting passages 63b, 63c fluidly connect a respective annulus 64 associated with one valve bore 53 to a respective annulus 64 associated with another valve bore 53. The first and second connecting passages 63b, 63c may be fluidly connected via a common trunk line or hydraulic passage 66. Such a hydraulic passage 66 is disclosed in Applicant's co-pending U.S. patent application Ser. No. 17/552,032, filed on Dec. 15, 2021, now U.S. Pat. No. 11,644,116 and titled "UNITIZED VALVE BODY HAVING FLOW PASSAGES" which is commonly owned with the present application and the contents of which are incorporated herein by reference in its entirety. The hydraulic passage 66 may be connected to a pressurized fluid source such as a pump located external to the valve body 50.

The plurality of annuluses 64 are axially spaced apart from each other along a corresponding valve bore 53. The annuluses 64 are also in fluid communication with the corresponding valve bore 53. Each annulus 64 is in fluid communication with a corresponding passage 63 via an inlet/outlet port 68. As best shown in FIG. 7, one or more annuluses 64 define an outer portion 70 having an outer diameter and an innermost portion 72 located at an interface between the valve bore 53 and the spool valve 52. The outer diameter of the outer portion 70 is greater than a diameter of the inner cylindrical surface 62 of the valve bore 53. The outer portion 70 is fluidly connected to the corresponding passage 63 and has a first axial length X1. The innermost portion 72 is fluidly connected to the valve bore 53 and has a second axial length X2 that is smaller than the first axial length X1. For example, the first axial length X1 may be at least two (2) times greater than the second axial length X2. Stated differently, if the second axial length X2 is 1.5 millimeters (mm), the first axial length X1 is at least 3 millimeters (mm). In this way, the length of the spool valve 52 is allowed to be reduced, which also reduces the overall size of the valve body 50. The flow area of the respective annulus 64 also allows for hydraulic fluid to flow between the passage 63 and the valve bore 53 within a predetermined pressure drop.

The valve body 50 of the present disclosure being additively manufactured provides the benefit of allowing one or more of the plurality of annuluses 64 to define the outer portion 70 having an axial length that is different from an axial length of the innermost portion 72 that is located at the interface between the valve bore 53 and the spool valve 52. The valve body 50 of the present disclosure being additively manufactured also provides the benefit of reduced passage lengths allowed by connecting passages in multiple dimensions. The plurality of annuluses 64 of the valve body 50 are also of a sufficient size to allow for powder removal once the additive manufacturing process of the valve body 50 is complete.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A unitized valve body for use in an automatic transmission, the unitized valve body comprising:
   a valve bore configured to receive a valve; and
   a first annulus in fluid communication with and surrounding the valve bore, the first annulus defining an outer portion having an outer diameter and an innermost portion located at an interface between the valve bore and the valve, the outer portion having a first axial length and the innermost portion having a second axial length,
   wherein the first axial length is greater than the second axial length.

2. The unitized valve body of claim 1, wherein the first axial length is at least two times greater than the second axial length.

3. The unitized valve body of claim 1 further comprising:
   a second annulus in fluid communication with the valve bore and axially spaced apart from the first annulus; and
   a hydraulic passage fluidly coupling the first annulus and the second annulus.

4. The unitized valve body of claim 3, wherein the second annulus defines an outer portion having an outer diameter and an innermost portion located at an interface between the valve bore and the valve, the outer portion of the second annulus has a third axial length and the innermost portion of the second annulus has a fourth axial length, the third axial length is greater than the fourth axial length.

5. The unitized valve body of claim 1 further comprising a hydraulic passage extending at least partially through the unitized valve body and fluidly coupled to the first annulus, and wherein the hydraulic passage is configured to fluidly couple the first annulus to a pressurized fluid source located external to the valve body.

6. The unitized valve body of claim 5, wherein a flow area of the first annulus allows for fluid to flow between the hydraulic passage and the valve bore with a predetermined pressure drop.

7. The unitized valve body of claim 1, wherein the valve body does not include mechanical fasteners.

8. The unitized valve body of claim 1, wherein the valve body is formed by additive manufacturing.

9. The unitized valve body of claim 1, wherein the valve body does not include a separator plate.

10. A unitized valve body for use in an automatic transmission, the unitized valve body comprising:
    a valve bore configured to receive a valve; and
    a plurality of annuluses axially spaced apart from each other, the plurality of annuluses in fluid communication with and surrounding the valve bore, each annulus defining an outer portion having an outer diameter and an innermost portion located at an interface between the valve bore and the valve, the outer portion having a first axial length and the innermost portion having a second axial length,
    wherein the first axial length is greater than the second axial length.

11. The unitized valve body of claim 10, wherein the first axial length is at least two times greater than the second axial length.

12. The unitized valve body of claim 10, further comprising a hydraulic passage fluidly coupling a first annulus of the plurality of annuluses and a second annulus of the plurality of annuluses.

13. The unitized valve body of claim 10 further comprising a hydraulic passage extending at least partially through the unitized valve body and fluidly coupled to a first annulus of the plurality of annuluses, and wherein the hydraulic passage is configured to fluidly couple the first annulus to a pressurized fluid source located external to the valve body.

14. The unitized valve body of claim 13, wherein a flow area of the first annulus allows for fluid to flow between the hydraulic passage and the valve bore with a predetermined pressure drop.

15. The unitized valve body of claim 10, wherein the valve body is formed by additive manufacturing.

16. The unitized valve body of claim 10, wherein the valve body does not include mechanical fasteners.

17. A unitized valve body manufactured by an additive manufacturing process, the unitized valve body comprising:
a valve bore; and
a plurality of annuluses in fluid communication with and surrounding the valve bore, each annulus defining an outer portion having an outer diameter and an innermost portion located at an interface between the valve bore and a valve, the outer portion having a first axial length and the innermost portion having a second axial length,
wherein the first axial length is greater than the second axial length.

18. The unitized valve body of claim 17, wherein the first axial length is at least two times greater than the second axial length.

19. The unitized valve body of claim 17 further comprising a hydraulic passage fluidly coupling a first annulus of the plurality of annuluses and a second annulus of the plurality of annuluses.

20. The unitized valve body of claim 17 further comprising a hydraulic passage extending at least partially through the unitized valve body and fluidly coupled to a first annulus of the plurality of annuluses, and wherein the hydraulic passage is configured to fluidly couple the first annulus to a pressurized fluid source located external to the valve body.

* * * * *